United States Patent
Hough et al.

(10) Patent No.: US 8,620,913 B2
(45) Date of Patent: Dec. 31, 2013

(54) INFORMATION MANAGEMENT THROUGH A SINGLE APPLICATION

(75) Inventors: Paul J. Hough, North Bend, WA (US); Anoop Gupta, Woodinville, WA (US); Raymond E. Ozzie, Seattle, WA (US); Pavel Curtis, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 823 days.

(21) Appl. No.: 12/098,753

(22) Filed: Apr. 7, 2008

(65) Prior Publication Data

US 2011/0047160 A1 Feb. 24, 2011

(51) Int. Cl.
*G06F 7/00* (2006.01)
*G06F 17/30* (2006.01)

(52) U.S. Cl.
USPC .......................................................... 707/732

(58) Field of Classification Search
None
See application file for complete search history.

(56) References Cited

U.S. PATENT DOCUMENTS

| | | | |
|---|---|---|---|
| 5,727,129 A | 3/1998 | Barrett et al. | |
| 5,774,123 A | 6/1998 | Matson | |
| 5,886,683 A * | 3/1999 | Tognazzini et al. | 715/700 |
| 6,189,024 B1 | 2/2001 | Bauersfeld et al. | |
| 6,327,586 B1 | 12/2001 | Kisiel | |
| 6,714,917 B1 * | 3/2004 | Eldering et al. | 705/7.33 |
| 7,200,804 B1 | 4/2007 | Khavari et al. | |
| 2001/0039546 A1 | 11/2001 | Moore et al. | |
| 2004/0177319 A1 | 9/2004 | Horn | |
| 2004/0267700 A1* | 12/2004 | Dumais et al. | 707/2 |
| 2005/0102564 A1* | 5/2005 | Oeda et al. | 714/20 |
| 2005/0108092 A1* | 5/2005 | Campbell et al. | 705/14 |
| 2005/0206658 A1* | 9/2005 | Fagans | 345/660 |
| 2006/0031214 A1* | 2/2006 | Solaro et al. | 707/4 |
| 2006/0139319 A1* | 6/2006 | Kariathungal et al. | 345/156 |
| 2006/0242554 A1* | 10/2006 | Gerace et al. | 715/501.1 |
| 2006/0253432 A1* | 11/2006 | Eagle et al. | 707/3 |
| 2007/0061278 A1 | 3/2007 | Schirmer et al. | |
| 2009/0055355 A1* | 2/2009 | Brunner et al. | 707/3 |
| 2009/0150806 A1* | 6/2009 | Evje et al. | 715/762 |

OTHER PUBLICATIONS

Senserini, et al. Archiving and Accessing Web Pages: The Goddard Library Web Capture Project http://www.dlib.org/dlib/november04/hodge/11hodge.html. Last accessed Sep. 6, 2007.

Adobe Solutions for Guided Benefits Enrolment. Use Collected Enrolment Data More Efficiently. http://www.adobe.com/uk/government/pdfs/guided_benefits_enrollment_sb.pdf. Last accessed on Sep. 6, 2007.

Truong, et al. Vicariously Sharing Captured Web Experiences through an Automated Recommendation System. ftp://ftp.cc.gatech.edu/pub/gvu/tr/2002/02-26.pdf. Last accessed on Sep. 6, 2007.

* cited by examiner

*Primary Examiner* — Uyen Le
(74) *Attorney, Agent, or Firm* — Lee & Hayes, PLLC

(57) ABSTRACT

Automatic capturing and recording of data in a single application is provided. The data can be obtained from multiple sources and over a short time or over an extended time. Personalized notations can be annotated with the data to provide a user with more personal information relating to why the particular data was captured and recorded. Selection of the single application can be a function of a type of the data, a user preference, or combinations thereof.

20 Claims, 10 Drawing Sheets ced through a single application.

INFORMATION MANAGEMENT THROUGH A SINGLE APPLICATION

BACKGROUND

The amount of data available to information seekers has grown astronomically, whether as the result of the proliferation of information sources on the Internet, or because of private efforts to organize business information within a company, or any of a variety of other causes. As the amount of available data grows, so does the need to be able to categorize or organize that data so that the data can be more efficiently searched.

Conventional computer systems require a user to run separate searches to retrieve data objects from Internet services and from the client computer and other local data storage, even if the user utilizes identical searches on the client computer and on Internet services. Consequently, users may have to run multiple searches to locate data objects from various data sources. In addition, the user may forget to search a relevant data source and, therefore, fail to locate pertinent data objects.

People searching for information or desiring compilation of data objects do not have a simple and intuitive way of bringing all these pieces together. Thus, the pieces, in order to be compiled, must be processed though an intensive manual function. For example, if a person is comparative shopping, a spreadsheet or other application must be manually created and the comparisons input manually. This manual compilation is time-consuming and errors can result due to an incorrect entry or due to other problems.

SUMMARY

The following presents a simplified summary in order to provide a basic understanding of some aspects of the disclosed examples. This summary is not an extensive overview and is intended to neither identify key or critical elements nor delineate the scope of such aspects. Its purpose is to present some concepts in a simplified form as a prelude to the more detailed description that is presented later.

In accordance with one or more examples and corresponding disclosure thereof, various aspects are described in connection with providing a mechanism for automatically collecting segments, photos, notes and/or other data and recording such information at substantially the same time as the information is gathered. According to an aspect, as a user browses the Internet, the information viewed (e.g., web pages visited), or a subset thereof, is gathered and automatically captured and categorized. This captured data can automatically be placed in an application, such as a spreadsheet application or a database, for example. At substantially the same time as the information is captured, notes or other related data (including personalization) can be combined with the captured information. Recording notes and related data can provide relevant and related information to the user when the data is reviewed at a later time. This innovation can be utilized with various personal and work related functions, such as shopping, checkbook balancing, research, and so forth.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the various aspects may be employed. Other advantages and novel features will become apparent from the following detailed description when considered in conjunction with the drawings and the disclosed examples are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components and/or modules and/or may not include all of the components and/or modules discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Figure 1:
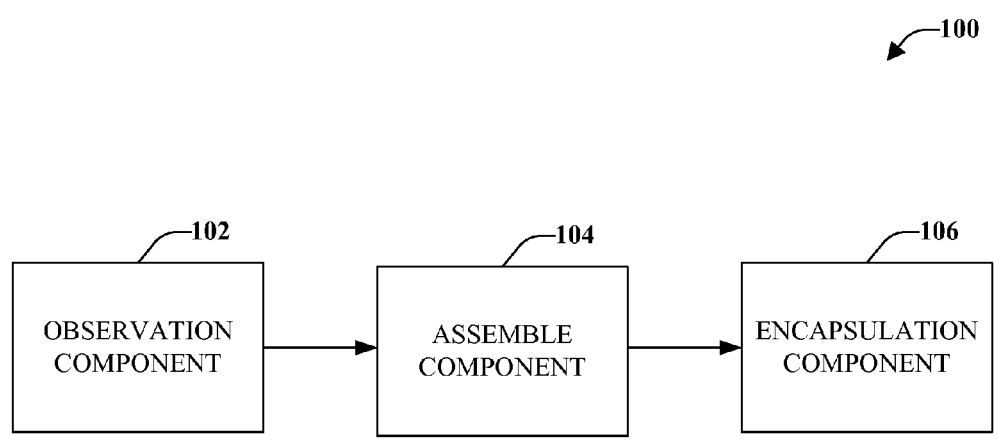
FIG. 1 illustrates a system for managing information through a single application.

Referring initially to FIG. 1, illustrated is a system 100 for managing information through a single application. As individuals consume information, there might be many reasons for desiring the information to be automatically gathered. For example, gathering the information can enable cohesiveness with regarding to the disparate types of information that might be consumed from a multitude of sources. For example, if an individual is reviewing the lasted news events regarding a particular situation (e.g., tropical storm) that individual might be accessing different websites (e.g., news, local networks, radio stations, international news reporting agencies, social networks, and so on). The user might also be accessing blogs, pictures, videos, and so forth that contain information relating to the relevant topic (e.g., tropical storm). The user may desire to capture the information for later use, such as for a school report or scientific research paper. Instead of requiring the user to manually print, write down, or "cut and paste" the information in order to retain, categorize, and/or gather the information, system 100 can automatically perform these functions. This can allow the user to devote more energy and time to the task at hand or to spend the time doing other functions (e.g., spend time with family).

In further detail, system 100 includes an observation component 102 that can be configured to monitor behaviors and acknowledges data from an external application (e.g., Internet). In accordance with some aspects, observation component 102 can acknowledge data from an application internal to the device on which system 100 is operating, including information previously gathered, utilizing the disclosed aspects. In accordance with some aspects, the incoming data can be from an external source, an internal source, or combinations thereof. The incoming data can be, for example, at least a subset of a webpage.

The behaviors being observed by observation component 102 can relate to a user's behavior and can include such actions as a search for key words or key phrases, a pattern of searching or requesting information relating to a common theme (e.g., distinguished by similar words, phrases, websites, and so forth, or combinations thereof). The behavior can be based on a current session, based on past sessions, and/or based on historical information. For example, a user might frequently request a search for a particular stock quote or a multitude of stock quotes. Based on this behavior, observation component 102 can associate the multiple search requests for the stock quotes as related, although requested over the course of a few days, weeks, months, or even years.

Acknowledging the data from an external (or internal) application can include automatically collecting segments of data or the entire data content. The segments or entirety of the data can be collected at substantially the same time as the data is consumed by the user. Observation component 102 can collect the data based on various behaviors, such as scrolling actions, pausing at certain portions of the information, eye gazing patterns, and/or highlighting certain sections with a point-select-and-drag function. The data can also be collected by observation component 102 based on other factors including a manual request for collection of the data at substantially the same time as the data is viewed, based on predefined user preferences, based on similar data that has been captured in the past (e.g., historical information), as well as other factors (e.g., inference). The incoming data can be associated with other incoming data based upon a subject matter of the data or a user entry indicating that the data is related.

An assemble component 104 can be configured to annotate the data acknowledged by observation component 102 with personalized annotated data. In accordance with some aspects, the personalized annotated data includes metadata. This annotated data can be notes and other information (e.g., audio information, comments, cross-references, and so forth) that can be manually input by the user or gathered from an internal application. In accordance with some aspects, the personalized annotated data includes the date and time that the information was captured (e.g., date/time stamp) so that, upon viewing the information at a later time, the data can be cataloged by the most current data, by the most out of date data, or based on other parameters (e.g., date range). Date/time sorting can be relevant in financial situations (e.g., stock quotes, pricing of merchandise, check book balancing, accounts payable, accounts receivable, as well as other financial concerns) the sorting can also be relevant to a user's thought patterns or progression of research, and so forth. The personalized annotated data can also include a cross-reference to information already gathered, which might be relevant to a current data gathering process and/or can be utilized to create a listing of information sources.

Both the acknowledged data and the personalized data can be unified into a single accessible application by an encapsulation component 106. Encapsulation component 106 can autonomously select the type of application in which the data should be unified. The selected application does not have to be the same type of application that was utilized for the data in its original form. In accordance with some aspects, the application can be manually selected by the user and/or the selection can be based on predefined criteria and automatically applied to the particular application. For example, when numbers or financial information is involved (e.g., pricing for a piece of furniture) and multiple websites or other sources are viewed, encapsulation component 106 can select a spreadsheet application (or the predefined criteria can indicate that if numbers are involved a spreadsheet application should be used). In accordance with another example, if text is to be captured, a word processing application can be utilized. If pictures are captured, an imaging application can be utilized, and so forth.

The data retained within the single application can be thought of as a mashup that combines data from more than one source into the single application. The mashup can include gathered and categorized data as well as the personalized annotated data, thus providing information that is relevant to the particular user. The user can also interact with system 100 to modify or delete data and/or append to the data. Thus, as more data is consumed, or more recent data is discovered, the retained data can be expanded or brought up-to-date. In accordance with some aspects, system 100 can automatically update the data with the most current information by automatically accessing the source of the underlying information and appending the data to the existing data or replacing the existing data with the new data.

The information retained by encapsulated component 106 can be presented to a user, upon request, in any perceivable format. In accordance with some aspects, if system 100 determines that new or updated information is available, system 100 can prompt the user asking if the latest information should be gathered and/or system 100 can automatically gather the information prior to presenting the information to the user.

Figure 2:
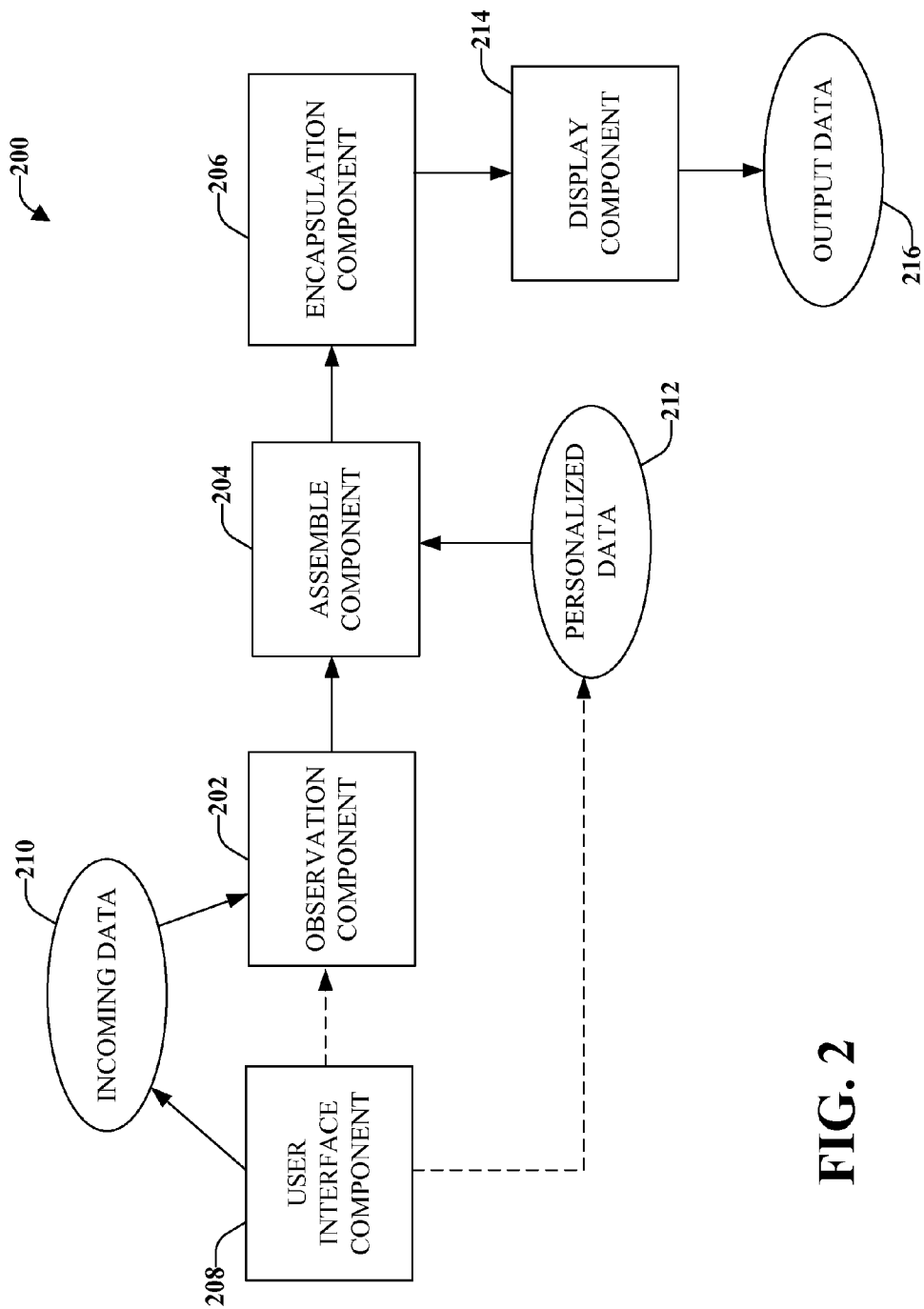
FIG. 2 illustrates another system that assembles information from disparate sources and maintains the information in format suitable to be rendered through a single application.

FIG. 2 illustrates another system 200 that assembles information from disparate sources and maintains the information in format suitable to be rendered through a single application. The single application can be any application suitable for the user and/or the gathered data. Examples of applications include, but are not limited to, spreadsheet applications, word processing applications, database application, media players, or other types of applications and/or application software. It should be noted that FIG. 2 is described with reference to a user desiring to purchase a dining room table; however, the disclosed aspects can be applied to many different types of uses and scenarios and the disclosed aspects are not limited to the example provided.

System 200 includes an observation component 202 that observes behaviors and accepts incoming data 210 relating to those behaviors. Also included is an assemble component 204 that annotates the incoming data 210 with the personalized data 212. An encapsulation component 206 that compiles both the incoming data 210 and the personalized data 212 and maintains the compilation within a single application that is readily accessible is also included in system 200.

A user can interact with system 200 through a user interface component 208, which can provide a graphical user interface (GUI), a command line interface, a speech interface, Natural Language text interface, and the like. For example, a GUI can be rendered that provides a user with a region or means to load, import, select, read, etc. information and can include a region to present the results thereof. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the information conveyance such as vertical and/or horizontal scroll bars for navigation and toolbar buttons to determine whether a region will be viewable can be employed.

The user can also interact with the regions to select and provide information through various devices such as a mouse, a roller ball, a keypad, a keyboard, a pen, gestures captured with a camera, and/or voice activation, for example. Typically, a mechanism such as a push button or the enter key on the keyboard can be employed subsequent to entering the information in order to initiate information conveyance. However, it is to be appreciated that the disclosed aspects are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

A user can input a search for various search terms (e.g., for dining room tables). Various types of information can be presented to the user with results of the search (e.g., wood tables, glass-topped tables, and so forth) the results can also present different manufactures, suppliers, retailers, and so forth, each of which can be accessed through a single website or a multitude of different website. As a user navigates through the different websites, the user can select various dining room tables (or other searches) to be tracked or maintained in order for the user to compare prices, shipping costs, financing terms, and other information. For example, the user can interact with user interface component 208 to select desired items, or items that the user might be interested in purchasing. In accordance with some aspects, system 200 can automatically distinguish the results from each other based on, for example, entered search terms or phrases, other information that the user has selected (including historical information) as well as based on other factors (e.g., predefined criteria). Thus, if the user is looking for a particular type of table (e.g., glass top table), system 200 can infer that a table not matching that description would not be desirable to the user and can determine that those particular items should not be presented to the user and/or not gathered as incoming data that should be gathered.

The data relating to the glass top tables is communicated to observation component 202 as incoming data 210. In accordance with some aspects, the incoming data 210 can be pulled from the website based on the observed behavior. For example, if the user has marked or otherwise indicated that information relating to dining room tables with glass tops should be tracked, system 200 can automatically capture other dining room tables with glass tops even if the user has not manually selected that particular table, in such a manner, a more comprehensive listing can be captured.

At substantially the same time as the incoming data 210 is received, assemble component 204 can include and/or annotate information that is personalized by the user with the incoming data 210. The user can enter the personalized data 210 through user interface component 208. Such information can include a user's observations or other data that the user desires to associate with the incoming data 210 (e.g., "I really like this table but it is too expensive from this company", "This looks too much like Jane's dining room table", "My sister would really like this table"). Such information can be useful to the user if the information is reviewed at a later time (e.g., a user might forget why a particular item was tagged or saved). Thus, the personalized data 212 can refresh the user's memory and can be used for various other purposes while reviewing the data.

An encapsulation component 206 compiles the relevant incoming information 210 and the personalized information 212 into a single application. For example, the dining room table information can be retained in a spreadsheet application. Links can be provided that allow the user to view an image of the table (for this example). Links can also be provided to the actual website or webpage from which the information was obtained. However, the purpose of system 200 is to allow a user to capture relevant information or a subset of information and access that information though a single application. This mitigates the need for the user having to access the disparate information sources to obtain the information at a later time, if the information can be found (e.g., same search results presented). Thus, saving the user time and expense.

When the user desires to view the saved information, a display component 214 can be configured to access the encapsulation component 206 and retrieve the information. The information is presented to the user as output data 216. For example, the user can be presented with a spreadsheet application that includes information relating to the cost of each dining room table, shipping fees, table dimensions, and so forth. Based on the output data 216 the user can quickly perceive the differences and compare the dining room tables to facilitate making a determination as to which table will be purchased, if any. The information might also be presented using more than one application, such as a spreadsheet application and a viewer application, which can allow photos of each of the tables to be presented.

Thus, system 200 can mitigate the need for the user having to manually record information and having to remember where that information can be found. For example, if a person is comparative shopping, as discussed with the dining room table example above, a spreadsheet or other application must be manually created and the comparisons input manually. This manual compilation is time-consuming and errors can result due to an incorrect entry or due to other problems, which can be mitigated by system 200 automatically collecting the information.

Figure 3:
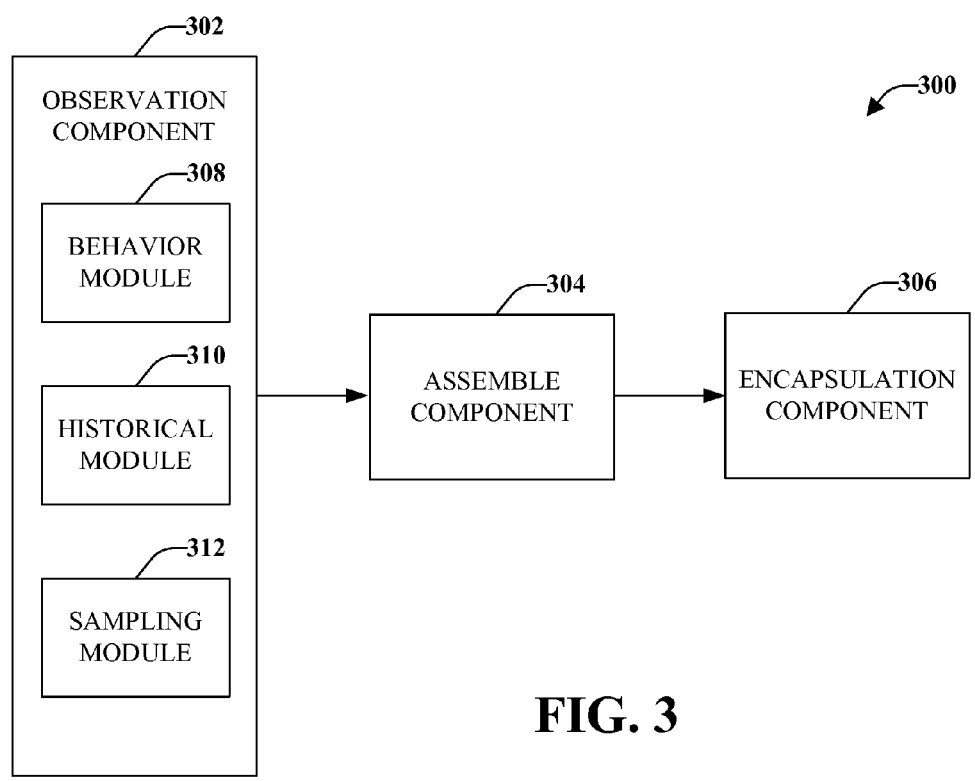
FIG. 3 illustrates another system for compiling information from various sources into a single, common application.

FIG. 3 illustrates another system 300 for compiling information from various sources into a single, common application. System 300 includes an observation component 302 that can be configured to receive instructions and input data, an assemble component 304 that can be configured to append personalized data to the input data, and an encapsulation component 306 that retains the input data and the appended personalized data in a retrievable format that can be accessed through a single application.

In more detail, observation component 302 can include a behavior module 308 that can be configured to detect a user's behavior as the user interacts with system 300. The incoming data can be gathered based on the detected behavior. The detected behavior can relate to user inputs into a keyboard, mouse, selection device, or other device by which a user interacts with system 300 (e.g., microphone, touch-screen, and so forth). For example, if a user scrolls through a document quickly, it might indicate that information contained in the document is not important. In another example, if a user clicks in succession on different photos and then pauses on a particular photo, it might indicate that the particular photo is important to the user and should be captured.

In accordance with some aspects, the observed behavior relates to actions observed through a camera or similar device that can observe a user's eye patterns or gazing patterns on a particular portion or section of a screen or display. If a user's gaze rests on a particular section of the screen, behavior module 308 might interpret that the information contained in that portion of the screen is important and should be captured or retained for future purposes.

The observed behavior can also relate to common search terms or phrases entered by a user and the importance of each successive search as it relates to a previous search. For example, a user enters a search for average salaries in Denver, Colo. and then conducts a search for wages for nurses. The information relating to the Denver search can be considered substantially similar to the search for nurses and both searches can be captured in a single application, with distinctions that differentiate each search. The distinctions can allow the user to interpret the information with its relevance to the search conducted. Thus, if the searches were not related, the user can disregard or modify the collected data.

Also included in observation component 302 is an historical module 310 that can be configured to observe previous searches or information selected by the user. The historical information can relate to information captured and retained by system 300 at some point in the past (e.g., earlier today, last week, last month, last year). Thus, historical module 310 can be configured to maintain a listing of previous information, which can include previous searches or entered search terms. Based on the information captured by historical module 310, observation module 302 can automatically select information that should be captured during a current selection. For example, if every few days a user enters a search for savings account interest rates in a particular geographic area and/or from selected financial institutions, historical module 312 can retain the information relating to the type of interest rates, the area, and/or the institution. Thus, when a user begins to enter similar search terms, system 300 can automatically capture the information that the user most likely desires.

In accordance with some aspects, a sampling module 312 can be configured to automatically update information input into system. Thus, periodic sampling or gathering of data can be performed based on user preferences, observed user behaviors, historical information, and so forth. Continuing the above example, based on the frequency of the search, sampling module 312 can automatically infer that a new search should be performed, and the application updated (or appended) with the most recent data. Thus, the information can be compiled by sampling module 312 and the information retained by encapsulation component 306 can be automatically updated. This allows the user to view the most recent data while mitigating the need for the user to manually search for the information. This can save the user time and mitigate false data entered due to manual entry mistakes.

Figure 4:
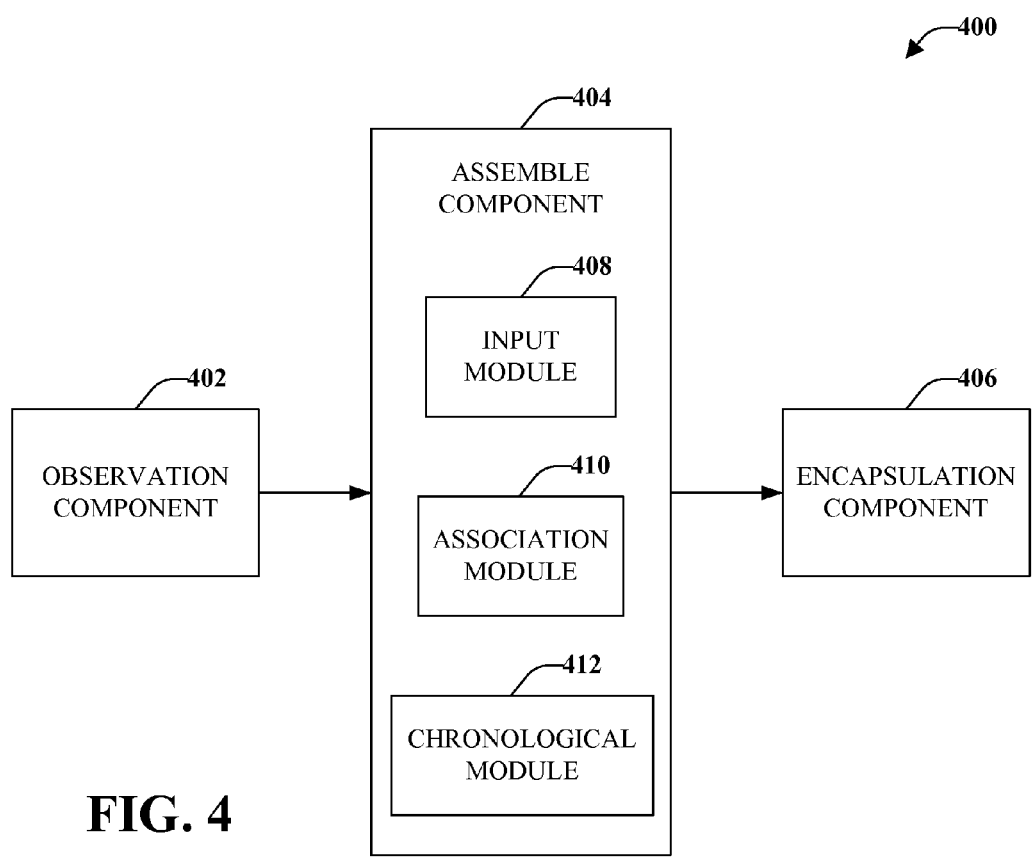
FIG. 4 illustrates another system for managing information through a single application.

FIG. 4 illustrates another system 400 for managing information through a single application. System 400 is similar to the above figures and includes an observation component 402, an assemble component 404, and an encapsulation component 406. Users can interact with system 400 to compile information and at least a subset of the information in conjunction with personalized information can be retained in a single application.

In order to personalize the information, assemble component 404 includes an input module 408 that can be configured to receive a user input relating to the information or subset of information gathered. The user input can be annotated to the information at substantially the same time the information is captured or at a different time. For example, a user can input various types of information (e.g., keyboard input, microphone input, other input) that provides the user (or another viewing the data) with useful data when the information is viewed at a later time. This can be important if a user is collecting data for research or another project and would like to enter prompts, references, or other annotations to be referred to or referenced later.

Also included in assemble component 404 is an association module 410 that can be configured to retain the source of the information, which can be internal or external to the device on which system 400 is utilized. If the information is from an internal source, the association can be to the location on the device from where the information was pulled. If the information is from an external source, the association can be a website, a URL address, another device, and other places from which information can be captured.

A chronological module 412 can be configured to associate a time and/or date with the captured information and/or with the annotated information. The date/time information associated with either or both the captured information and the annotated information can distinguish multiple inputs. Thus, for example, if the user adds personal information on a first day and adds further personal information on a second day, the information input on both days can be distinguished so that the user knows when each annotation was made, and, at a later time, this can be utilized so that the user might be able to understand why the information was entered, especially if the information is conflicting. In the case of captured information, in an example of capturing stock quote information, it might be important for the user to distinguish different days and prices in order to make an informed decision whether to buy or sell a particular stock.

Thus, when the user views the information, it can be combined with personalized annotations that are rendered at substantially the same time as the underlying information. The information and associated annotations can be presented to the user in any perceivable format (e.g., audible, visual).

Figure 5:
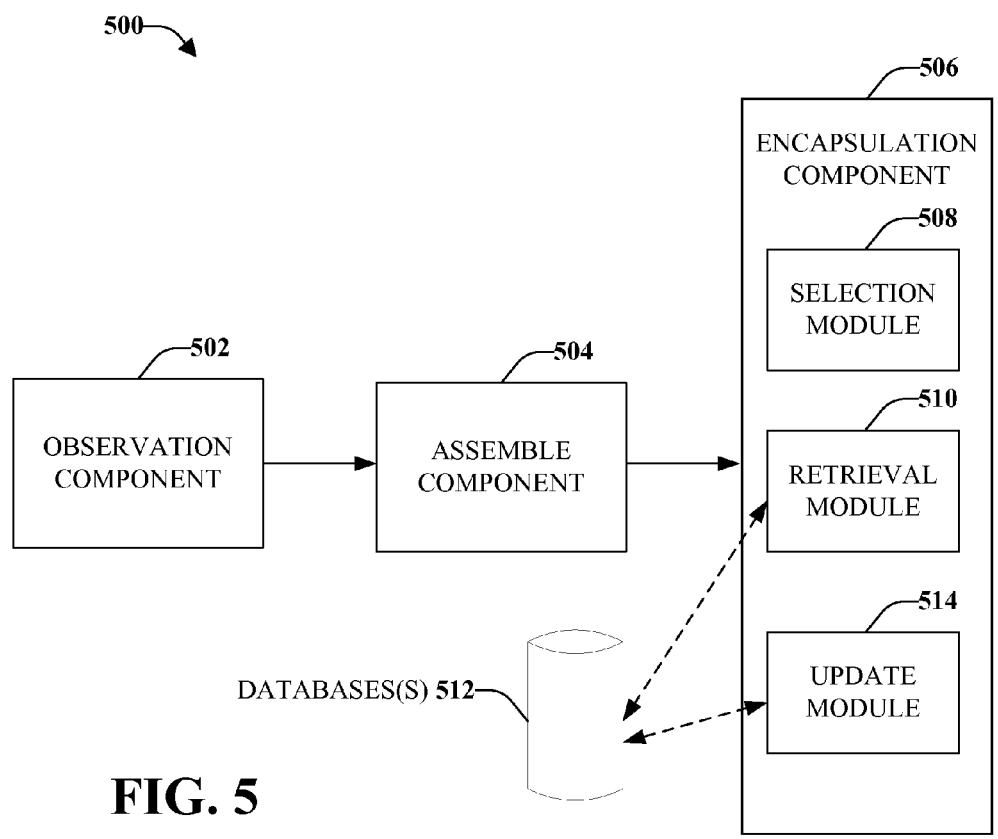
FIG. 5 illustrates a system for rendering information that is managed and retained in a single application.

FIG. 5 illustrates a system 500 for rendering information that is managed and retained in a single application. System 500 is similar to the above systems and includes an observation component 502, an assemble component 504, and an encapsulation component 506. In order to retain and render the information in a single application, encapsulation component 506 includes a selection module 508 that can be configured to select an appropriate application, which can be a single accessible application), for the retained information as a function of a type of data. The selected application can include, but is not limited to spreadsheet applications, word processing applications, database applications, media players, or other types of application and application software. The selected application should conform to user preferences and/or the type of information gathered.

A retrieval module 510 can be configured to selectively access the retained information upon request. Retrieval module 510 can include or be associated with one or more databases 512 in which the retained information is maintained. Database(s) 512 can be memory and/or some other medium that can store information. By way of example, and not limitation, the database(s) 512 can include nonvolatile and/or volatile memory. Suitable nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of example and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Also included in encapsulation component 506 is an update module 514 that can be configured to selectively and automatically update information retained in database(s) 512 if there is more current data available. Such updates can include information manually requested to be updated by a user, information determined to be out of date, or other reasons for updates (e.g., information no longer relevant). In accordance with some aspects, update module 514 can be configured to discard information if the inclusion of the information will result in duplicates within the database(s) 512.

Figure 6:
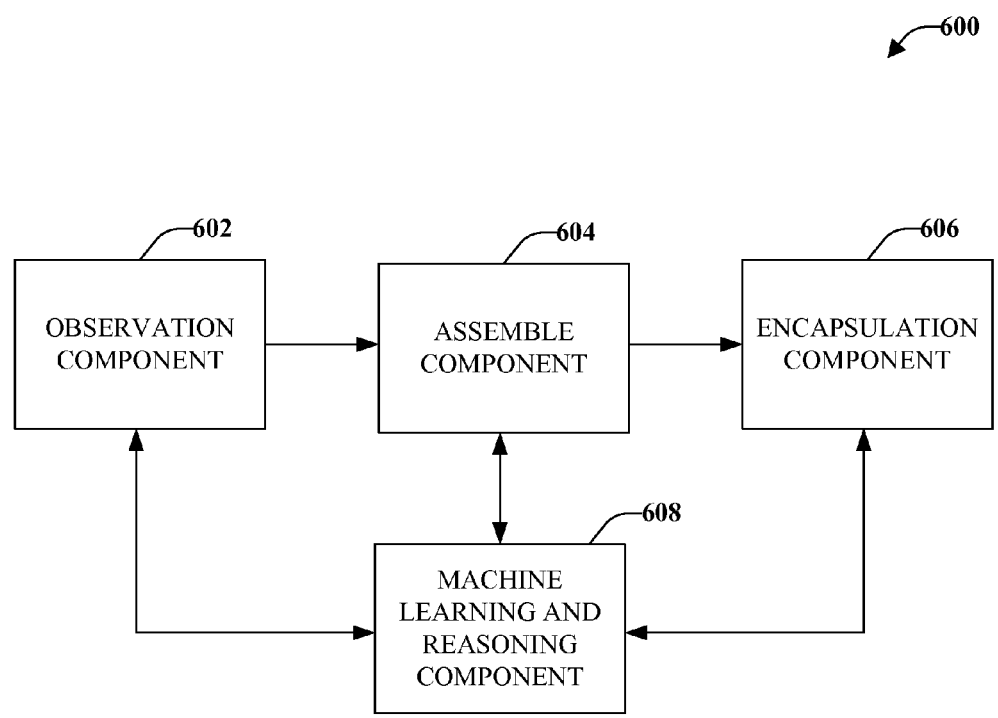
FIG. 6 illustrates a system that employs machine learning to facilitate automating one or more features in accordance with the disclosed aspects.

FIG. 6 illustrates a system 600 that employs machine learning to facilitate automating one or more features in accordance with the disclosed aspects. System 600 includes an observation component 602 that acknowledges incoming data and an assemble component 604 that annotates the incoming data with personalized data. Also included in system 600 is an encapsulation component 606 that gathers the incoming data and the personalized data in a single accessible application and outputs the data upon request. The machine learning can be facilitated by machine learning and reasoning component 608, as illustrated. The machine learning and reasoning component can employ artificial intelligence, rules based logic, or other logic for carrying out various functions.

Artificial intelligence based systems (e.g., explicitly and/or implicitly trained classifiers) can be employed in connection with performing inference and/or probabilistic determinations and/or statistical-based determinations as in accordance with one or more aspects as described hereinafter. As used herein, the term "inference" refers generally to the process of reasoning about or inferring states of the system, environment, and/or user from a set of observations as captured through events, sensors, and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject embodiments.

The various embodiments (e.g., in connection with gathering data, appending personal information to the gathered data, presenting the gathered and appended data in a single application) can employ various artificial intelligence-based schemes for carrying out various aspects thereof For example, a process for determining if a particular application should be used for certain data or if certain data should be retained can be facilitated through an automatic classifier system and process. Moreover, where multiple applications are employed having the same or similar resources, the classifier can be employed to determine which application to employ in a particular situation.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of capturing data, for example, attributes can be words or phrases or other data-specific attributes derived from the words (e.g., common themes, the presence of key terms), and the classes are categories or areas of interest (e.g., importance to the user).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the one or more embodiments can employ classifiers that are explicitly trained (e.g., through a generic training data) as well as implicitly trained (e.g., by observing user behavior, receiving extrinsic information). For example, SVM's are configured through a learning or training phase within a classifier constructor and feature selection module. Thus, the classifier(s) can be used to automatically learn and perform a number of functions, including but not limited to determining according to a predetermined criteria when to grant access, which stored procedure to execute, etc. The criteria can include, but is not limited to, the amount of data or resources to access through a call, the type of data, the importance of the data, etc.

In accordance with some aspects, an implementation scheme (e.g., rule) can be applied to control and/or regulate collected information, appended information, applications to which the information is applied, and so forth. It will be appreciated that the rules-based implementation can automatically and/or dynamically regulate input of information and access to the information based upon a predefined criterion. In response thereto, the rule-based implementation can allow and/or deny inputs, grant and/or deny access, and so forth by employing a predefined and/or programmed rule(s) based upon any desired criteria (e.g., data type, data size, data importance, and so forth).

By way of example, a user can establish a rule that can require a trustworthy flag and/or certificate to access particular information contained in a single application whereas, other information within a particular application may not require such security credentials. It is to be appreciated that any preference can be facilitated through pre-defined or pre-programmed in the form of a rule.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the disclosed aspects are not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 7:
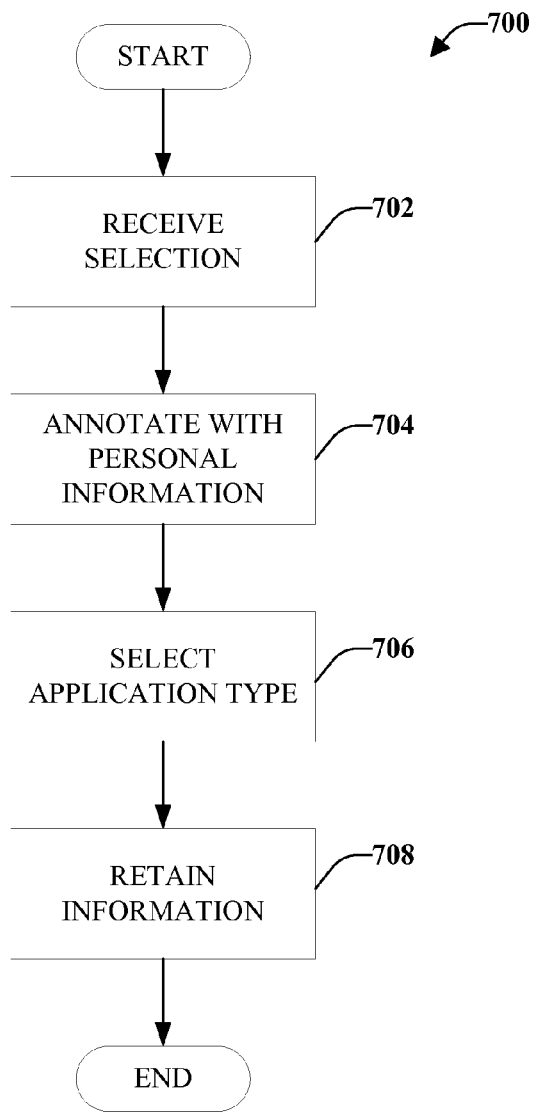
FIG. 7 illustrates a method for cataloging data and rendering the data utilizing a single application.

FIG. 7 illustrates a method 700 for cataloging data and rendering the data utilizing a single application. Method 700 can allow information from disparate sources to be gathered, categorized, and accessed through a single application.

At 702, a data selection is received. The data selection can be a subset of data, such as a portion of a website or a company directory, or the entire amount of data available (e.g., entire website or entire company directory). The data can be selected by the user or selected automatically based on perceived user behaviors, user preferences or based on other criteria (e.g., key words or phrases).

The subset (or more) of data is annotated with personalized data, at 704. The personalized data can include information entered by the user, such as notes, comments, or other information that the user desires to be associated with the data selection. The personalized data can also be a time stamp and/or source of the selected data.

At 706, an application type for the annotated data (selected data and personalized data) is chosen. The application type can be chosen as a function of a type of the selected data (e.g., numbers, financial information, photos, text, and so forth) and/or as a function of a user preference (e.g., always place numbers in a spreadsheet application).

The annotated data can be retained for further use with the selected application type, at 708. When a user desires to perceive the annotated data, the data is automatically presented in the chosen application. Thus, the user can perceive all the data in a single place rather than having to search for and access the disparate sources of information.

Figure 8:
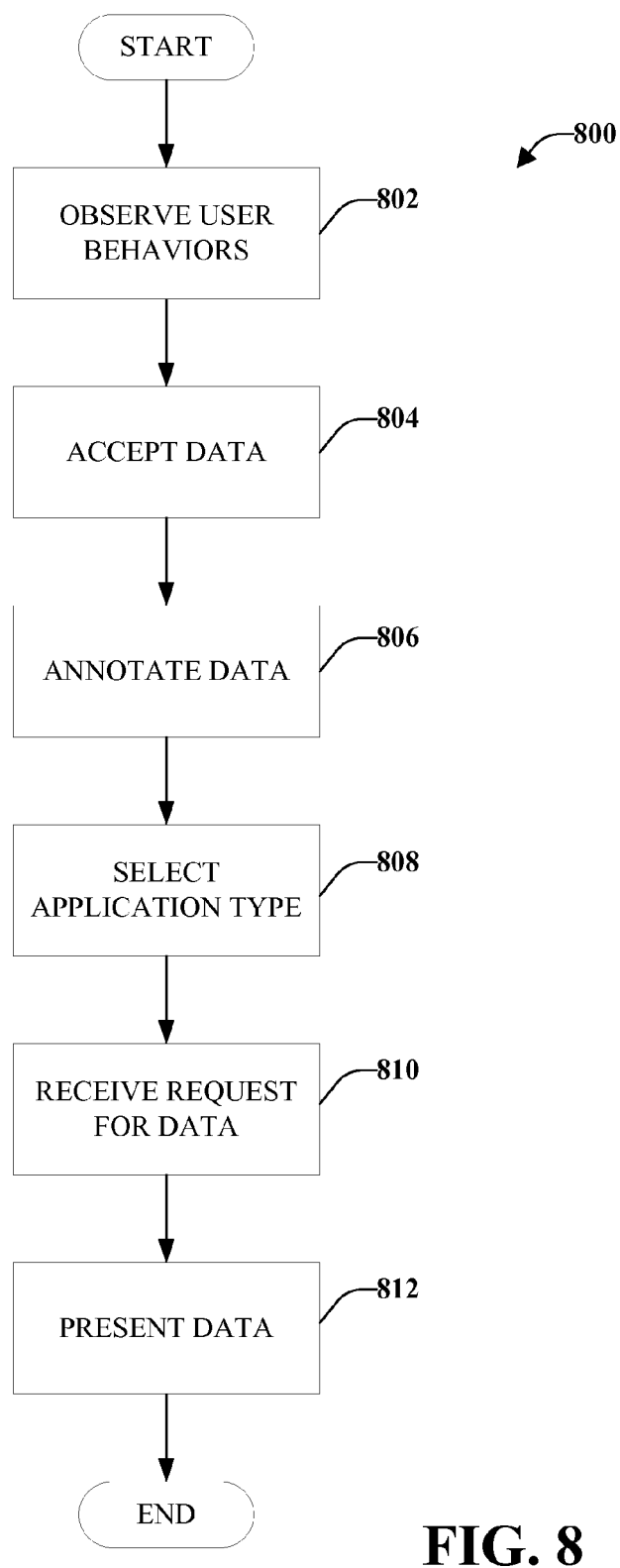
FIG. 8 illustrates another method for cataloging data and rendering the data utilizing a single application.

FIG. 8 illustrates another method 800 for cataloging data and rendering the data utilizing a single application. Method 800 starts, at 802, with observance of user behavior. The observed behavior can include observing manual inputs, gaze patterns, or combinations thereof. The manual inputs include scrolling actions with a mouse, clicking actions, entry of key words or key phrases, and so forth. Gaze patterns can include observing portions of a screen on which the gaze lingers for longer than a predetermined amount of time, which can indicate interest in a particular portion of the data being displayed.

At 804, at least a subset of data is accepted as input. The selected data can be manually selected by the user, such as by highlighting at least a portion of the data or indicating though another means that at least a portion of data should be captured. Additionally or alternatively, the subset of data can be selected automatically based on the observed user behaviors.

Data to be annotated to the at least of subset of data is received, at 806. The annotation can include personalized data, such as comments or other information that the user would like to be associated with the data. The annotation can also include a time stamp and/or link to the source of the data, as well as other information.

At 808, an application type for the annotated data is selected. The selection can be made as a function of a type of the incoming data, a user preference, or combinations thereof. The annotated information can be retained for use with the selected application type.

A request to receive the annotated data is received, at 810. The annotated data is presented, at 812, in any perceivable format and in conformance with the chosen application type. In accordance with some aspects, the annotated data can be automatically updated if a more current version of the incoming data is available.

Figure 9:
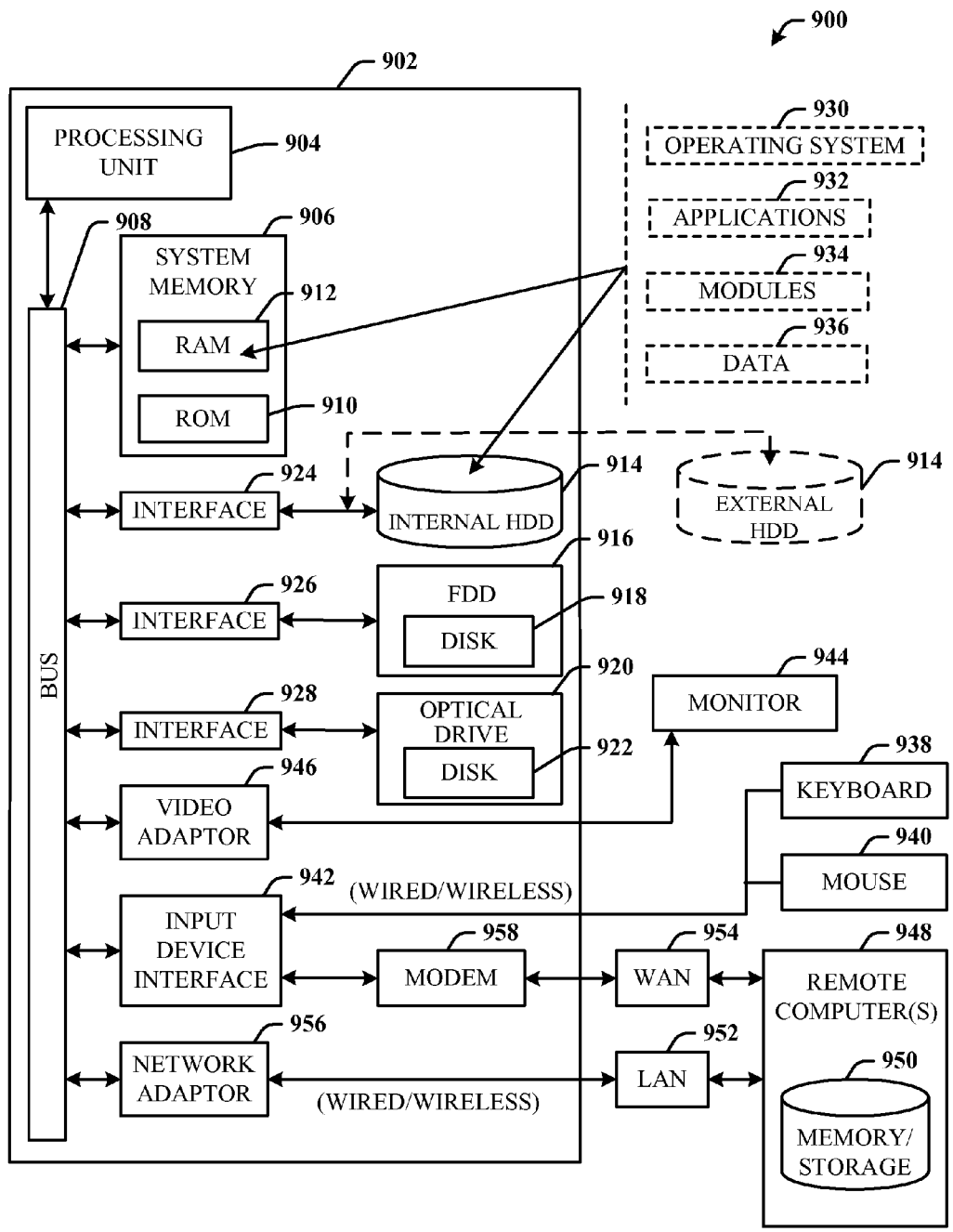
FIG. 9 illustrates a block diagram of a computer operable to execute the disclosed aspects.

Referring now to FIG. 9, there is illustrated a block diagram of a computer operable to execute the disclosed architecture. In order to provide additional context for various aspects disclosed herein, FIG. 9 and the following discussion are intended to provide a brief, general description of a suitable computing environment 900 in which the various aspects can be implemented. While the one or more aspects have been described above in the general context of computer-executable instructions that may run on one or more computers, those skilled in the art will recognize that the various aspects also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the one or more aspects.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the various aspects can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 through an interface, such as a video adapter 946. In addition to the monitor 944, a computer typically includes other peripheral output devices (not shown), such as speakers, printers, etc.

The computer 902 may operate in a networked environment using logical connections through wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 through the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
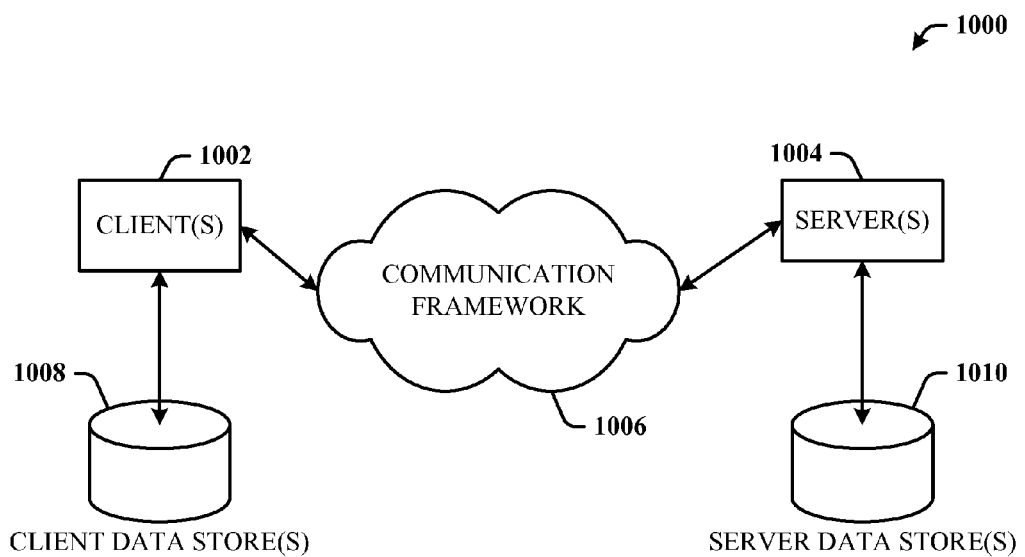
FIG. 10 illustrates a schematic block diagram of an exemplary computing environment operable to execute the disclosed aspects.

Referring now to FIG. 10, there is illustrated a schematic block diagram of an exemplary computing environment 1000 in accordance with the various aspects. The system 1000 includes one or more client(s) 1002. The client(s) 1002 can be hardware and/or software (e.g., threads, processes, computing devices). The client(s) 1002 can house cookie(s) and/or associated contextual information by employing the various aspects, for example.

The system 1000 also includes one or more server(s) 1004. The server(s) 1004 can also be hardware and/or software (e.g., threads, processes, computing devices). The servers 1004 can house threads to perform transformations by employing the various aspects, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated through a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." The term "or" as used in either the detailed description of the claims is meant to be a "non-exclusive or".

The word "exemplary" as used herein to mean serving as an example, instance, or illustration. Any aspect or design described herein as "exemplary" is not necessarily to be construed as preferred or advantageous over other aspects or designs.

Furthermore, the one or more aspects may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

What is claimed is:

1. A system, comprising:
one or more processors; and
memory, communicatively coupled to the one or more processors, for storing:
an observation component that acknowledges incoming data, the incoming data being identified based at least in part on an order in which the incoming data is selected, wherein the incoming data is received from multiple sources and is retained for future purposes based at least in part on whether a scrolling velocity of a user scrolling through the incoming data meets or exceeds a predetermined threshold;

an assemble component that annotates the incoming data with personalized data; and an encapsulation component that gathers the incoming data and the personalized data into a mashup of data in a single accessible application and outputs the mashup of data upon request.

2. The system of claim 1, wherein the memory further stores a selection module that chooses the single accessible application as a function of a type of the incoming data, a user preference, or combinations thereof.

3. The system of claim 1, wherein the memory further stores a behavior module that detects a user behavior and gathers the incoming data based on the detected user behavior.

4. The system of claim 3, wherein the detected user behavior is entry of common search terms or phrases, a searching pattern, a common theme, or combinations thereof.

5. The system of claim 1, wherein the incoming data is at least a subset of a webpage.

6. The system of claim 1, wherein the incoming data is from an external source, an internal source, or combinations thereof.

7. The system of claim 1, wherein the assemble component automatically annotates the incoming data with a date/time stamp.

8. The system of claim 1, wherein the encapsulation component saves the incoming data and the personalized data as the mashup of data.

9. The system of claim 1, wherein the memory further stores an update module that automatically updates the incoming data in the single accessible application if additional incoming data becomes available.

10. The system of claim 1, wherein the encapsulation component retains a link to a source of the incoming data.

11. The system of claim 1, wherein the encapsulation component updates at least a portion of the incoming data or the personalized data before outputting the mashup of data.

12. A method, comprising:
receiving, by a computing device, a selection from a search that includes at least a subset of data;
annotating, by the computing device, the subset of data with personalized data;
selecting, by the computing device, an application type for the annotated data;
retaining, by the computing device, the annotated data for use with the selected application type; and
updating, by the computing device, the annotated data by periodically sampling a source of the subset of data based at least in part on user preferences, observed user behavior, and historical information associated with a user, the updating including automatically inferring that a new search is to be conducted based at least in part on a frequency of the search, such that previous searches are employed in connection with automatically performing inference determinations that determine when to conduct the new search for updated information of the annotated data.

13. The method of claim 12, further comprising:
observing the user behavior; and
selecting the subset of data based on the observed user behavior.

14. The method of claim 13, wherein the observing the user behavior includes observing manual inputs, gaze patterns, or combinations thereof.

15. The method of claim 12, further comprising:
receiving a request for the annotated data; and
presenting the annotated data in a format associated with the selected application type.

16. The method of claim 12, further comprising automatically updating the annotated data if a more current version of the subset of data is available.

17. The method of claim 12, wherein the selecting the application type for the annotated data is a function of a type of the incoming data, the user preferences, or combinations thereof.

18. The method of claim 12, further comprising retaining a link to a source of the subset of data.

19. Computer storage media having computer-executable instructions that, when executed by one or more processors, cause the one or more processors to perform operations comprising:
accepting incoming data;
annotating the incoming data with personalized data;
choosing a single application to store the personalized data and the incoming data as a mashup of data, the single application being chosen based at least in part on a function of a type of the incoming data, a user preference, or combinations thereof;
receiving a request for the mashup of data;
presenting the mashup of data in a format associated with the chosen single application; and
updating the mashup of data to include currently available data in response to a manual user request to update the currently available data.

20. The computer storage media of claim 19, wherein the operations further comprise:
observing a user behavior; and
selecting at least a subset of the incoming data based on the observed behavior.

* * * * *